UNITED STATES PATENT OFFICE.

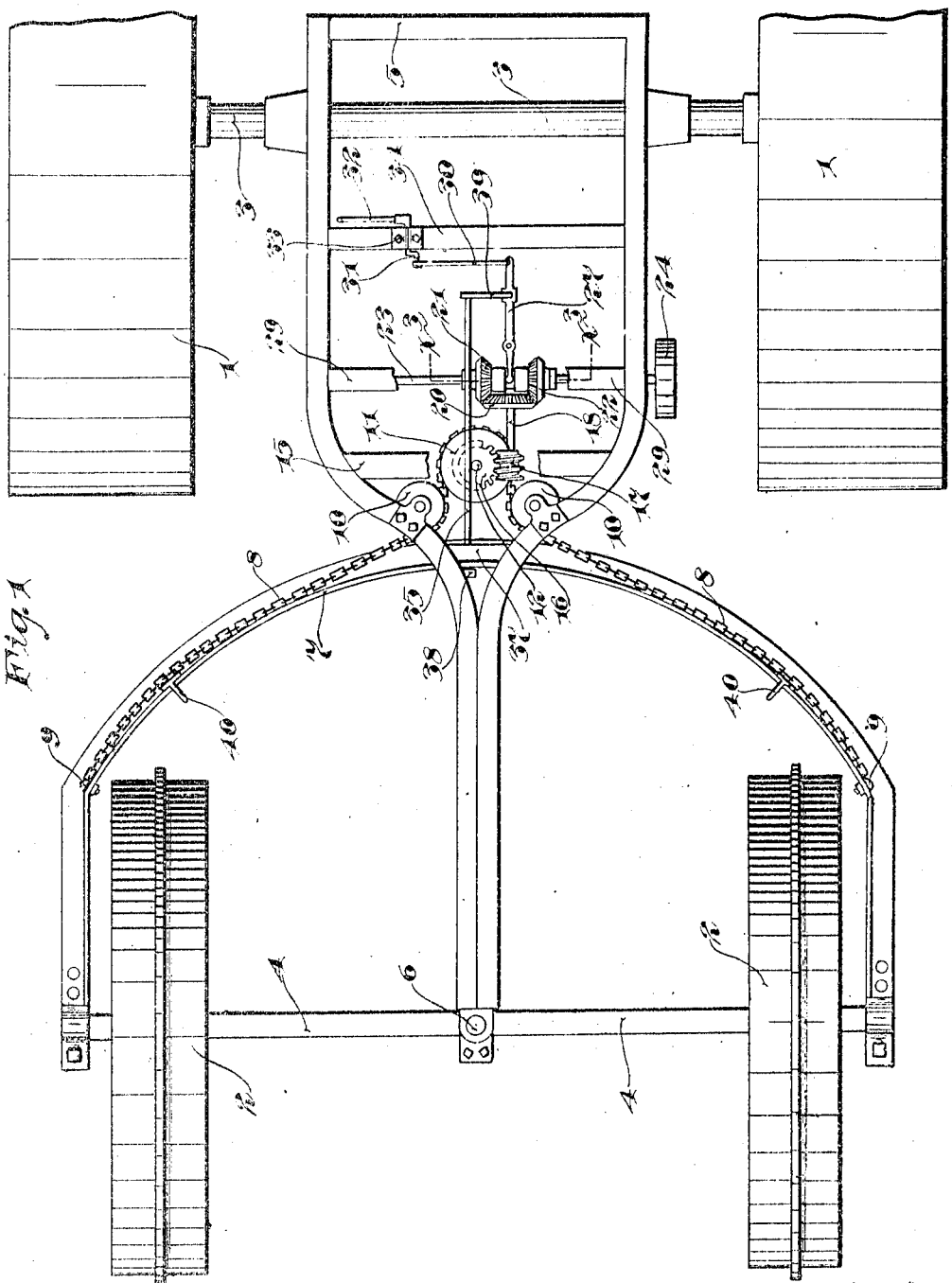

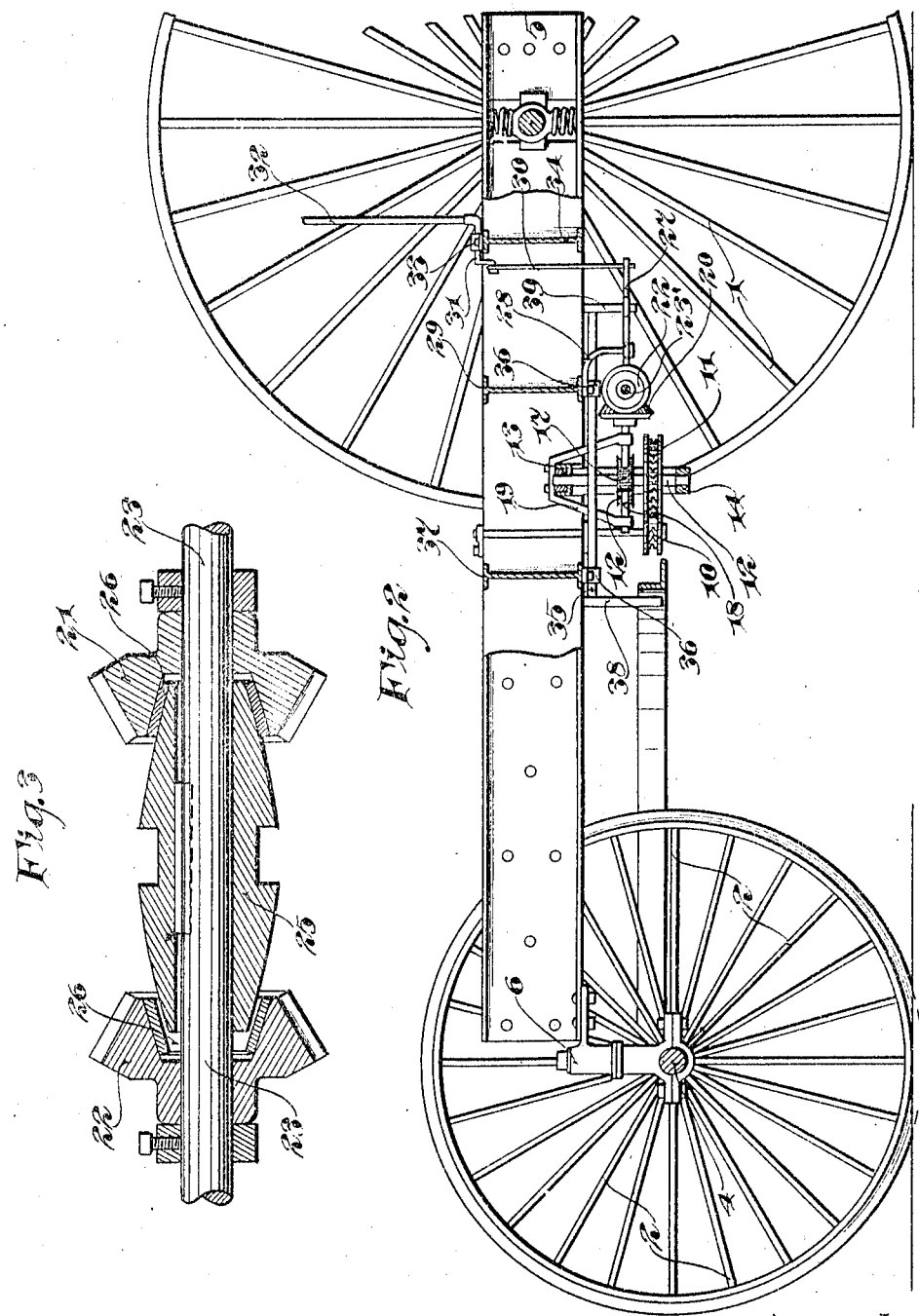

AUGUST HOVLAND, OF ST. PAUL, MINNESOTA.

STEERING MECHANISM FOR TRACTORS.

1,041,086.  Specification of Letters Patent.  Patented Oct. 15, 1912.

Application filed January 3, 1911. Serial No. 600,419.

*To all whom it may concern:*

Be it known that I, AUGUST HOVLAND, a citizen of the United States, residing at St. Paul, in the county of Ramsey and State of Minnesota, have invented certain new and useful Improvements in Steering Mechanism for Tractors; and I do hereby declare the following to be a full, clear, and exact description of the invention, such as will enable others skilled in the art to which it appertains to make and use the same.

My invention has for its particular object to provide an improved steering mechanism for tractors or traction engines and to this end the invention consists of the novel devices and combinations of devices hereinafter described and defined in the claims.

In steam and gasolene tractors it is customary to provide reversible clutch devices in the steering mechanism whereby the steering wheels may be oscillated at will in either direction from a constantly running driven shaft. As this steering mechanism has been hitherto arranged, great care must be taken to prevent engagement of the steering wheels with parts of the frame work when given extreme movements in either direction from longitudinal alinement with the traction wheels.

My invention provides means for automatically tripping the clutch of the steering mechanism out of action whenever the steering wheels are given maximum or extreme movements in either direction from their normal or from intermediate position in which they cause the rig to run straight ahead. This eliminates all necessary care in imparting extreme movements to the steering wheels and makes it impossible for the steering wheels to engage or damage the frame work or other parts of the rig even when carelessly manipulated.

The term clutch device is herein used in a broad sense to include any kind of mechanism whether positive or frictional in its action whereby the steering mechanism is thrown into and out of action.

In the accompanying drawings which illustrate the invention, like characters indicate like parts throughout the several views.

Referring to the drawings, Figure 1 is a plan view with some parts broken away and with some parts removed showing the tractor having my improved steering mechanism applied thereto. Fig. 2 is a view partly in side elevation and partly in vertical section showing the tractor illustrated in Fig. 1; and Fig. 3 is a vertical section taken through the clutch device on the line $x^3\ x^3$ of Fig. 1.

The traction wheels of the tractor are indicated by the numeral 1 and the steering wheels by the numeral 2. The traction wheels 1 are connected to a driving axle 3 in the usual or any suitable way and the steering wheels 2 are loosely journaled on the front axle 4. The engine for driving the traction wheels is not shown and may be of any suitable type, either an explosive engine or a steam engine and the driving connection therefrom and the traction wheels may be of the usual or any suitable design. The rear axle 3 carries the rear portion of a main or platform frame 5 which, as shown, is made up of a pair of channel bars and a rear cross bar, the said channel bars being separated at the rear portions and being brought together to rigidly connect by rivets, or otherwise, at their front portions so as to form the said frame with a narrow front portion permitting the steering wheels 2 to be moved approximately to the transverse center of the rig.

The front axle 4 is intermediately pivoted to a bearing 6 that is rigidly secured to the contracted front end of the main frame 5. The ends of the said axle 4 are rigidly secured to the forwardly projecting ends of the steering segment or arch bar 7, preferably made of angle iron and having its transverse body portion located at the rear of the steering wheels and bent on an arc that is concentric to the axis of the pivotal connection between the front axle 4 and the bearing 6. The said arch bar 7 lies in a horizontal plane, and to the outer extremities of its arched portion, steering chains 8 or similar flexible connections are attached at 9. These chains 8 are located above the lower horizontal flange of the arch bar 7 and bear against the upwardly extended flange thereof so that the latter serve as a sort of segmental drum for the said chains and serve to maintain a constant leverage throughout the pulling actions of the chains thereon.

The chains 8 are passed over idle guide sheaves 10 mounted on the intermediate portion of the main frame 5 and at their inner ends are attached to and wound upon a windlass drum 11. For convenience, the said chains 8 are described in the plural, but they may, and frequently will be made as a single chain, the intermediate portion of which works on a windlass drum or wheel 11, having a channeled periphery with sprocket-like recesses that prevent slipping of the chain thereon. The said windlass drum 11 is shown as secured to a short upright shaft 12 journaled in suitable upper and lower bearings 13 and 14 in a transverse tie bar 15 of the main frame 5. On the intermediate portion of the windlass shaft 12 is a worm gear 16 that meshes with a worm 17 secured to the front end of a small horizontal shaft 18 journaled in a bearing bracket 19 secured to the upper bearing 13. At its rear end, the shaft 18 is provided with a bevel gear 20 that meshes with a pair of reversely beveled pinions 21 and 22. The pinions 21 and 22 are loosely journaled on a transverse driving shaft 23 journaled in suitable bearings on the main frame 5 and provided at one end with a pulley 24 over which an engine driven belt, not shown, is adapted to run to impart rotary movement in a continuous direction to the said driving shaft.

Keyed to the shaft 23 and mounted to slide thereon between the pinions 21 and 22 is a double-ended friction clutch sleeve 25, the ends of which are adapted to be engaged at will with internal cone-shaped friction clutch seats 26 formed in the said pinions 21—22. The ends of the clutch sleeve 25 are adapted to be thrown into engagement at will with the clutch seat of either of the two pinions 21—22, by a shipper lever 27 which, as shown, is intermediately pivoted to a bearing bracket 28 rigidly secured on one of the transverse tie bars 29 of the main frame 5. The rear end of this shipper lever 27 is connected by a link 30 to a crank 31 formed on the lower end of a manually controlling lever 32 pivotally mounted at its lower end to a small bearing 33, shown as secured on one of the transverse tie bars 34 of the main frame 5. By manipulations of the lever 32 the clutch sleeve 25 may be frictionally connected at will to either of the pinions 21—22, and hence, the steering movements of the wheels 2 may be controlled by the operator in the usual way.

In applying the automatic clutch tripping device, I preferably employ a small rock shaft 35 which is journaled in suitable bearings 36 secured on the transverse tie bars 29 and 37 of the main frame 5. At its front end, the rock shaft 35 is provided with a depending arm 38, and at its rear end is provided with a depending arm 39 which latter, as shown, is connected to the rear portion of the shipper lever 27 by having its lower end passed through a perforation therein. For action on the arm 38, tripping lugs or abutments 40 are secured to the arch bar 7 at suitable points on each side of the center thereof. These tripping abutments 40 are so located and related to the other portion that when the steering wheels are given extreme movement in either direction, one or the other of said abutments will engage the arm 38 and rock the shaft 35 before the inwardly moved steering wheel is allowed to come into contact with the main frame 5. Furthermore, the arrangement of the said parts of the shipper lever 27 and friction clutch sleeve 25 is such that when the shaft 35 is rocked by engagement of the inwardly moving abutment 40 therewith, the clutch sleeve 25 will be disengaged from the particular pinion 21 or 22, as the case may be, and thus automatically throw the said clutch out of action or render the same inoperative to continue the movement of the inwardly moving steering wheel toward the contracted portion of said frame 5.

With this construction, the operator is free to use the controlling lever 32 to impart steering movements to the steering wheels without giving any attention, whatever, to extreme movements and without any danger whatever of extreme movements doing any damage to any part of the tractor. The device, furthermore, is of small cost.

The improved steering mechanism is especially designed for heavy tractors but may be employed generally as a steering mechanism for vehicles having wheels mounted to oscillate to impart the steering movements to such vehicles.

What I claim is:

1. The combination with a vehicle having a wheel equipped steering element, of a windlass drum with reversely acting flexible connections with the said steering element, a reversible drive with connections for reversely driving said windlass drum, a manually operated controller for said reversible drive and automatic tripping device on said flexible connections, for throwing said drive out of action at predetermined limits of movement of said steering element.

2. The combination with a vehicle having a wheel equipped steering element equipped with an arch bar, of a windlass drum having reversely acting flexible connections attached to opposite sides of said arch bar, a reversible drive connected to said windlass drum and including a reversely acting friction clutch, a shipper lever connected to the movable element of the said friction clutch, a manually operated controlling lever connected to said shipper lever, a rock shaft connected to said shipper lever and provided with a depending arm, and abutments on said arch bar operative on the said depending arm, substantially as and for the purposes set forth.

In testimony whereof I affix my signature in presence of two witnesses.

AUGUST HOVLAND.

Witnesses:
 ALICE V. SWANSON,
 HARRY D. GILGORE.